UNITED STATES PATENT OFFICE.

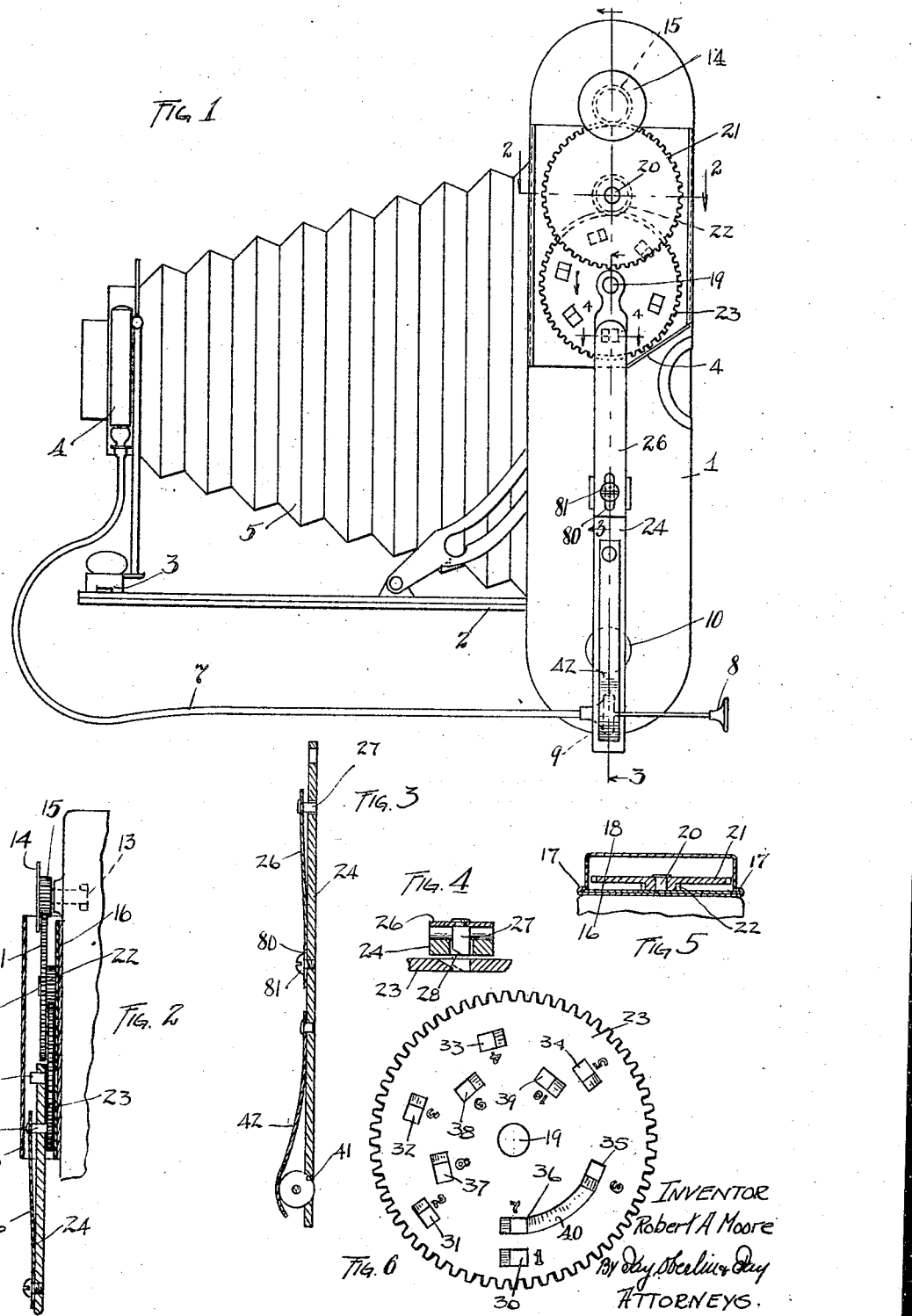

ROBERT A. MOORE, OF CLEVELAND, OHIO.

PHOTOGRAPHIC APPARATUS.

1,415,042.  Specification of Letters Patent.  Patented May 9, 1922.

Application filed July 5, 1919. Serial No. 308,799.

*To all whom it may concern:*

Be it known that I, ROBERT A. MOORE, a citizen of the United States, and a resident of Cleveland, county of Cuyahoga, and State of Ohio, have invented a new useful Improvement in Photographic Apparatus, of which the following is a specification, the principle of the invention being herein explained and the best mode in which I have contemplated applying that principle, so as to distinguish it from other inventions.

The subject of the present invention is a device intended for use with photographic apparatus, such as cameras and the like, for permitting the very rapid operation of the camera to take a number of pictures and to avoid the necessity for winding the film from one spool to the other after each exposure. In the ordinary magazine camera, which is at present in general use, a roll of sensitized film is inserted and then unrolled sufficiently to permit the end of the film to be attached to a second spool or mandrel, which is provided with means extending externally of the casing for winding the film from the magazine spool to the second spool to successively expose different negatives or portions of the sensitized film. This is not only a time-consuming and laborious operation, but unless done very carefully the various films on the roll will not be brought to the exactly correct position before the lens and the resulting pictures will extend off from the film at one side or the other.

The present improvement aims to provide a very simple means for performing this winding operation and one that can be inexpensively manufactured and readily attached to the standard camera now in general use, as well as being very conveniently and cheaply built into the same type of camera when manufactured. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation of a folding camera to which my improved device has been applied; Fig. 2 is a section on the line 2—2 in Fig. 1; Fig. 3 is a longitudinal section on the line 3—3 in Fig. 1 of the operating handle; Fig. 4 is a transverse section on the line 4—4 in Fig. 1; Fig. 5 is a section on the line 5—5 in Fig. 1; and Fig. 6 is a plan view of one of the gears.

In Fig. 1 I have shown the ordinary folding camera, which is so familiar that it need not be described in detail. The camera of course consists of a suitable rectangular casing 1 having a hinged cover 2, upon which is slidably mounted a plate 3 carrying the lens and shutter which are suitably enclosed in a thin cylindrical casing 4. Behind the shutter there is of course the usual bellows 5, while the shutter may be actuated by means of a wire 6 extending through a flexible tube 7 in the usual manner, the wire being provided with an operating handle 8 and the tube carrying an enlarged collar 9, which forms a bearing for the operating handle 8. The camera as above described is of standard construction in every particular and will be at once familiar to those having any knowledge of the photographic art.

Cameras of this character are ordinarily provided with two spools or mandrels for winding the film and for bringing it across in the casing 1 from one spool to the other. The roll of film is first inserted at the lower end of the camera, the spools being rotatably carried on the usual pins or studs 10, provided with button heads outside of the casing for engaging or disengaging the spool therefrom. The end of the roll of film is then brought across the back of the camera and inserted in a second spool at the other end of the casing. The second spool is provided with a slotted end which may be engaged by means of a stud mounted in the side of a camera and provided with a handle on the outside of the casing for winding in the film and unwinding it from the magazine spool on the stud 10.

My present improvements may be readily attached to this standard camera without any change other than the removal of the winding stud and handle from the top of a camera and the substitution therefor of a similar stud 12 provided with a key or pin 13 on its inner end for engaging in the notch in the winding spool. This stud 12 is provided with the usual button head 14 externally of the casing, beneath which is mounted a small pinion 15. This is the only substitution which needs to be made of any parts of the ordinary camera and when this new stud and pinion are inserted in place of the old one my device may be attached to the outside of the casing in such a way as to co-operate with this stud to effectively and accurately transfer the film from the magazine spool to the winding spool held by the stud 12.

The means for accomplishing this purpose include a support or plate 16, which may be readily mounted adjacent to the upper end of that side of the camera which is shown in Fig. 1, by means of several small screws. This plate is provided with inturned edges or flanges 17, in this way forming guide slots, within which is slidably mounted a support or slide 18. It is intended that there shall be sufficient friction between the plates 17 and 18 to permit of convenient movement of the plate 18 in the support 17, although the friction is sufficient to prevent accidental jarring of the upper plate out of any position in which it is set.

On the plate 18 are carried two studs 19 and 20, the stud 20 serving as an axis for two gears 21 and 22, which have the same axis, but the gear 22 is very much smaller than the gear 21. Mounted on the stud 19 is another gear 23, which is engaged with the gear 22, while the gear 21 is positioned to mesh with the pinion 15 on the stud 12 when the plate 18 is moved toward the latter a sufficient distance.

The gear 23 is provided with a series of circularly arranged, but unequally spaced, recesses or notches. Mounted on the stud 19, above the gear 23, is an actuating member or handle 24, which is adapted to have a one-way actuating movement in the direction of the arrow on the gear 23. On the handle 24 is slidably mounted a spring 26, provided with a pawl 27 extending through a notch 28 in the handle for engagement in the various notches in the gear 23. When the plate is engaged with one of these notches and the handle is moved in a counter-clockwise direction the gear 23 is similarly moved through a portion of a revolution, and because of the reducing action of a train of gears 23, 22, 21 and 15, several revolutions are given to the stud 12 and the winding spool which is carried thereon. In this way the winding spool is rotated sufficiently to bring a new negative or part of the film before the lens of the camera. The effective diameter of the winding spool is of course changed after each of these operations because of the additional film which is wound on the spool, and therefore the same number of revolutions will not in each case wind up the same amount of film, but increasing amounts. If this action were allowed the last two or three films would be badly misplaced with respect to the lens and the pictures would run off from the edge of each of these films, and therefore means must be provided to compensate for the increasing effective diameter of the winding spool.

I compensate for this variation in diameter in a very simple manner by spacing the successive notches 30, 31, 32, 33, 34 and 35 in the gear 23 so as to cause the handle 24, the operating movement of which is limited in one direction, to move the gear 23 through varying angles at each successive operation. Thus the notch 31 is positioned at a greater distance from the notch 30 than is the notch 32 from the notch 31, and so on.

Ordinarily the roll of films which are used in such a camera contains six negatives, but sometimes films of ten or more negatives are used, and in this case the additional negatives are provided for by forming a second series of notches 36, 37, 38 and 39 on the gear 23, this last-named series being arranged within the first-named series and the notch 36 being connected to the notch 35 of the first series by means of a recess 40. As the pawl 27 leaves the notch 35 on the return movement of the handle 24 it slides inwardly by reason of its engagement in this notch or recess 40, which is possible, as the spring 26 is slidably mounted on the handle 24. A positive movement of the pawl from the outer to the inner series of notches may be effected by normally sliding the spring 26 inward along the handle 24, which is made possible by the use of a slot 80 in the spring engaged by the retaining screw 81.

The handle 24 is provided at its outer end with a recess 41, which is covered by a spring 42 in such a way as to permit the enlarged collar 9 on the tube 7 to be swung into the notch beneath the spring so that the operator may operate both the shutter of the camera and my means for winding the film with one hand while holding the camera with the other. The train of gearing, and, in fact, almost the entire upper surface of the plate 16, is covered by means of a removable cap or plate 43, which is formed with an opening for the handle 24, while a stop 44 on this cover limits the downward movement, which is the operating movement of this handle.

The operation of my device is as follows:—The new roll of film is first inserted between the stud 10 and the film is then brought across the back of the camera and inserted in the winding spool, which is engaged with the stud 12 and the pin 13. The button 14 is then turned until the first film is brought to its proper position, which is indicated by the appearance of the number 1 below the small window in the back of the camera. The plate 18 is then moved toward the stud 12 until the gear 21 is engaged with the pinion 15. Before this engagement between these gears is effected, however, the gear 23 must be turned to bring the notch numbered 30 into registration with the arrow on the adjacent edge of the cover, and the handle 24 can then be sprung in a clockwise direction until the pawl 27 engages with this notch and the handle then sprung in a counter-clockwise direction to unwind the film to expose film No. 1. For convenience of operation the collar 9 is then inserted in the slot in the end of the handle 24. The handle is then returned in a clockwise direction, the beveled edge of the pawl 27 sliding out of the notch 30 and snapping into the next notch 31 when the handle has reached its original position, when the same operation may be repeated until the entire roll of film has been used.

I have found that a roll of these films can be used to take the six different pictures in a remarkably short space of time and in a period which is only a fraction of that required to take the same number of pictures with the ordinary camera, where the changing of the negative must be laboriously accomplished by turning the small handle provided on the spool for that purpose. The present improvements may furthermore either be constructed as an attachment or be placed upon cameras already built, or it may be built into the cameras when manufactured at a relatively slight expense and without increasing the over-all size of the camera more than one-eighth or three-sixteenths of an inch. This is possible because very small stamped gears may be used for the train of reduced gearing while the handle lies flat and parallel with the end of the camera, and, when not ready for operation, lies substantially within the projected end area of the camera.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a magazine photographic apparatus, the combination with a casing for receiving the photographic mechanism including two spaced film mandrels, of means for operating one of said mandrels including a support movably mounted on said casing, a train of reducing gears mounted on said support and adapted to be operatively engaged with one of said mandrels to rotate the same upon a predetermined movement of said support, one of said gears being provided with a series of spaced engaging faces, and a handle adapted to be successively engaged with said faces to intermittently rotate said gear upon movement of said handle.

2. In a magazine photographic apparatus, the combination with a casing for receiving the photographic mechanism including two spaced film mandrels, of means for operating one of said mandrels including a support movably mounted on said casing, a train of reducing gears mounted on said support and adapted to be operatively engaged with one of said mandrels to rotate the same upon a predetermined movement of said support, one of said gears being provided with a series of circularly arranged unequally spaced notches, and a handle pivoted upon the same axis as said last-named gear, said handle being provided with a spring pressed plunger adapted to engage in one of said notches in said gear to rotate said gear upon movement of said handle.

3. In a magazine photographic apparatus, the combination with a casing for receiving the photographic mechanism including two spaced film mandrels, of means for operating one of said mandrels including a support movably mounted on said casing, a train of reducing gears mounted on said support and adapted to be operatively engaged with one of said mandrels to rotate the same upon a predetermined movement of said support, one of said gears being provided with a series of circularly arranged unequally spaced notches, and a handle pivoted upon the same axis as said last-named gear, said handle being provided with a spring pressed plunger adapted to engage in one of said notches in said gear to rotate said gear upon movement of said handle, and said plunger being adapted to ride out of one of said notches upon a reverse movement of said handle and engage in the next adjacent notch.

4. In a magazine photographic apparatus, the combination with a casing for receiving the photographic mechanism including two spaced film mandrels, of means for operating one of said mandrels including a support movably mounted on said casing, a train of reducing gears mounted on said support and adapted to be operatively engaged with one of said mandrels to rotate the same upon a predetermined movement of said support, one of said gears being arranged with two concentrically arranged series of notches therein, and a handle pivoted upon the same axis as said last-named gear, said handle being provided with a slidably mounted spring pressed plunger adapted to engage in one of said notches and move said gear upon one way movement of said handles and to ride out of such notch upon movement of said handle in the reverse direction, and said gear having a recess connecting one of the notches in the outer series with one of recesses of the inner series.

5. In a magazine photographic apparatus, the combination of a casing for receiving the photographic mechanism including two spaced film mandrels, of means for operating one of said mandrels including a support movably mounted on said casing, a train of reducing gears mounted on said support and adapted to be operatively engaged with one of said mandrels to rotate the same upon a predetermined movement of said support, one of said gears being provided with a series of spaced engaging faces, and a movable member adapted to be successively engaged with said faces upon relative movement between said gear and said member.

6. In a magazine photographic apparatus, the combination of a casing for receiving the photographic mechanism including two spaced film mandrels, of means for operating one of said mandrels including a support mounted on said casing, a train of reducing gears mounted on said support and adapted to be operatively engaged with one of said mandrels to rotate the same upon a predetermined mounting of said support, one of said gears being provided with a series of spaced engaging faces, and a movable member adapted to be successively engaged with said faces upon relative movement between said gear and said member.

Signed by me, this 25 of June 1919.

ROBERT A. MOORE.